May 6, 1958  E. S. WILSON ET AL  2,833,474
CARD REGISTRATION CHECKING DEVICE
Filed Jan. 12, 1955  3 Sheets-Sheet 1
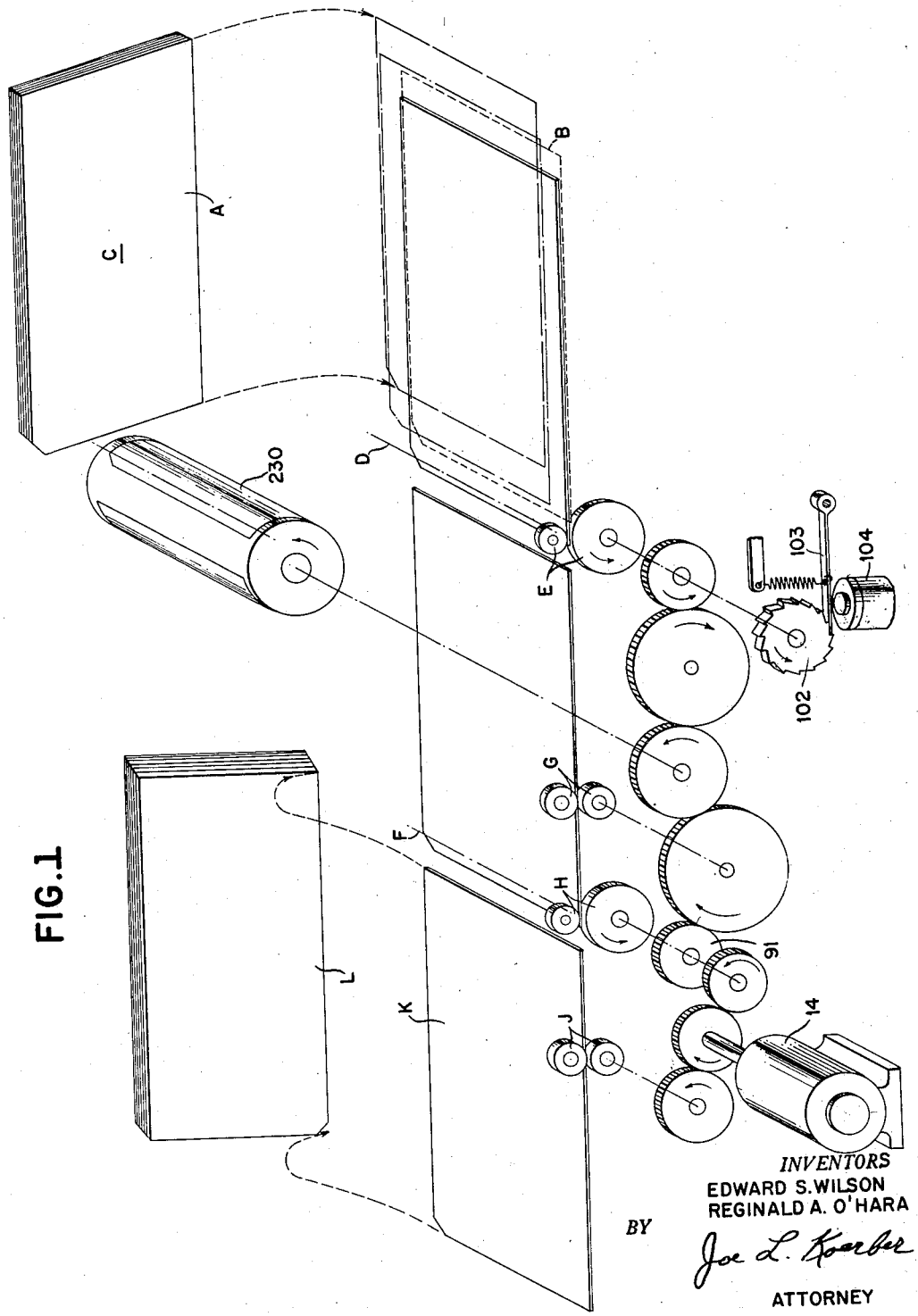
INVENTORS
EDWARD S. WILSON
REGINALD A. O'HARA
BY
Joe L. Koerber
ATTORNEY

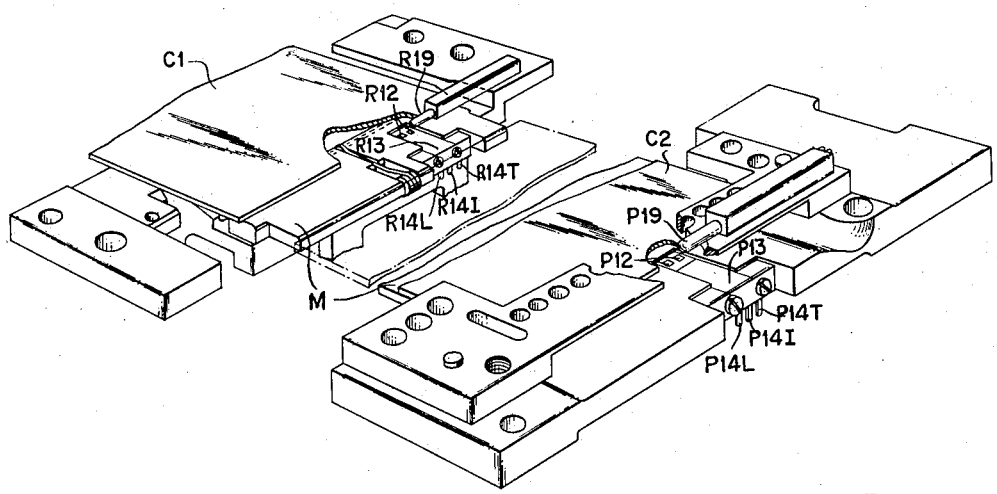
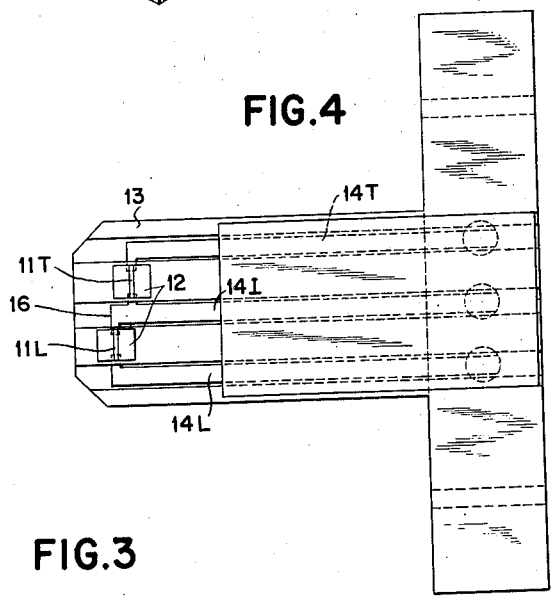
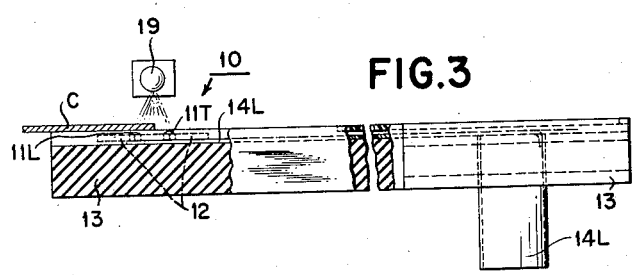

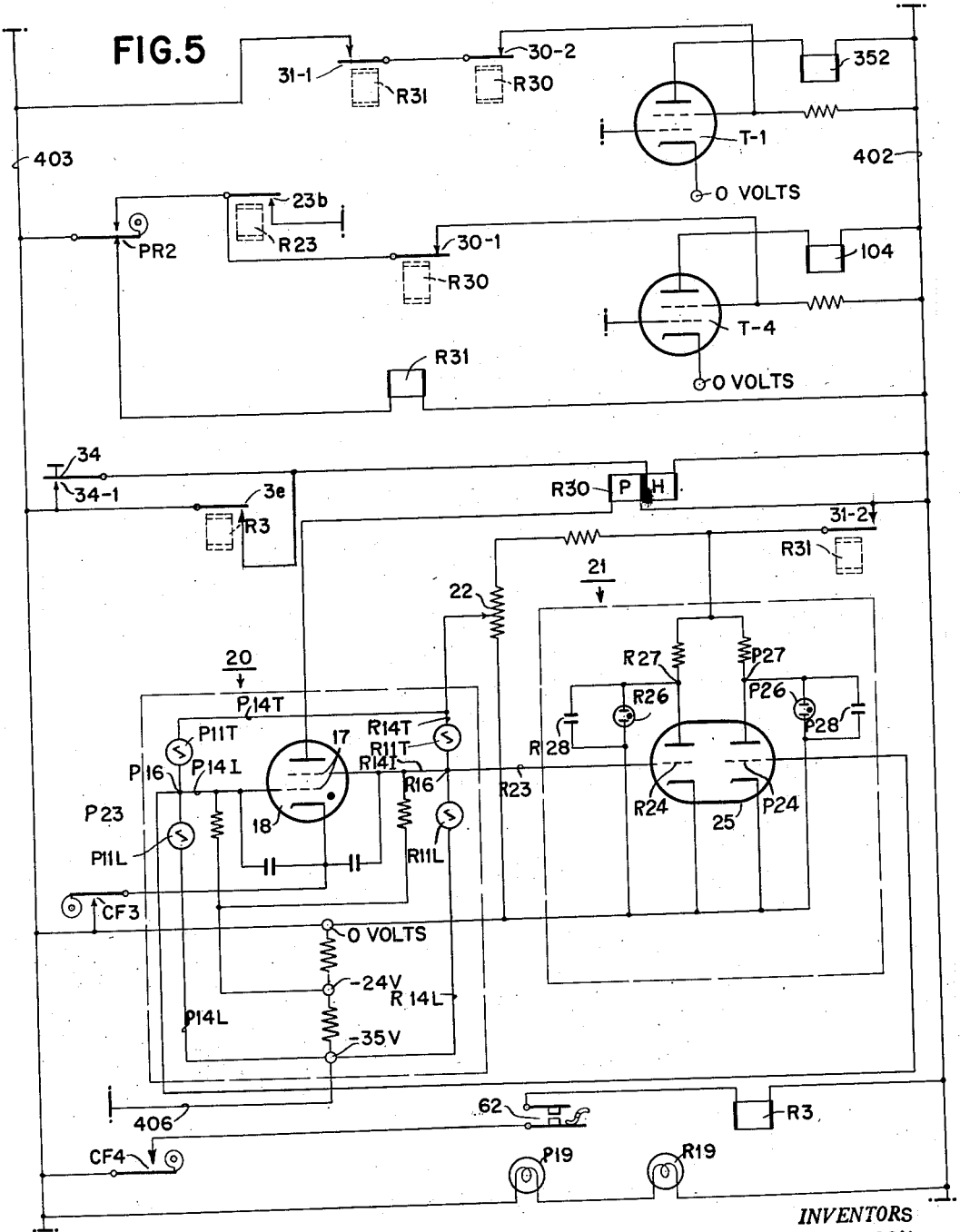

United States Patent Office 2,833,474
Patented May 6, 1958

2,833,474
CARD REGISTRATION CHECKING DEVICE

Edward S. Wilson, Poughkeepsie, and Reginald A. O'Hara, Staatsburg, N. Y., assignors to International Business Machines Corporation, New York, N. Y., a corporation of New York Application January 12, 1955, Serial No. 481,416

8 Claims. (Cl. 235—61.11)

This invention relates to a record handling machine and more particularly to devices for checking the registration of records at predetermined times during the machine operation.

Record cards used in the type of machine referred to hereinafter have longitudinally disposed rows of closely spaced index points. Information is recorded in the record cards by perforations at selected index points. As a record card is advanced past a row of perforating devices, it must be properly registered therewith if the perforations are to be made at the desired index points. When a record card having improperly punched holes is fed past a row of sensing devices for reading the perforations, the perforations may be sensed at the wrong time or possibly not at all. A record card may be out of registration due to being either retarded or advanced. In a machine having a punch station followed by a sensing station, a record card may be out of registration when moving past the perforating devices or it may be properly registered at that time and then be out of registration later when fed past the sensing devices. In either case an error may occur in the reading of the recorded data. By providing devices that are operable automatically at predetermined times during the machine operation for checking the positions of record cards relative to a perforating line and a sensing line, it is possible to assure that the record cards are properly registered both when data are recorded and when data are sensed. In the machine described hereinafter, one record card passes the sensing station while a second one passes a recording station. Such devices are associated with controls for preventing further machine operation when either or both of the record cards are out of registration.

A broad object of the invention is to provide means for automatically checking the registration of each record card with respect to predetermined points at predetermined intervals during the machine operation.

Another object is to provide devices for accurately determining the registration of record cards with respect to predetermined points within very precise limits.

Still another object is to provide devices that check for card registration and permit normal machine operations to resume only if the cards are found to be in registration with respect to predetermined points.

Yet another object is to provide devices for checking the registration of record cards and preventing resumption of machine operation if the cards are out of registration, whether the lack of registration is due to a card being advanced or retarded.

Another object is to provide means for checking registration of two cards simultaneously, to prevent resumption of machine operation if either or both records are found to be out of registration and to provide means for visually indicating which card or cards are out of registration.

Other objects of the invention will be pointed out in the following description and claims and illustrated in the accompanying drawings, which disclose by way of example, the principle of the invention and the best mode which has been contemplated of applying that principle.

In the drawings:

Fig. 1 is a perspective view of a card transporting mechanism.

Fig. 2 is a perspective fragmentary view showing the photocell checking devices at the sensing and punching stations.

Fig. 3 is a side elevation of a photocell unit.

Fig. 4 is a plan view of a pair of photocells and means for mounting.

Fig. 5 is a partial wiring diagram showing the control circuits for the checking devices.

The registration checking devices described hereinafter are illustrated in conjunction with a record perforating machine that is fully disclosed in the patent, Number 2,647,581, issued August 4, 1953, to E. W. Gardinor et al. Only so much of that machine as is necessary to the understanding of the present invention is described herein. Reference may be had to the above cited patent for additional details of the machine. Hereinafter, the above machine will be referred to simply as the machine.

In the machine as is schematically indicated in Fig. 1, a plurality of record cards C are placed in a card hopper at a point A and means are provided for feeding the record cards one at a time from the hopper to a pre-registration position B, then to a perforation station, arranged along a line D, past which the record card is advanced step-by-step by means of card feed wheels E and data is perforated therein under control of a manual keyboard or by duplication from a read station that is arranged along a line F. After passing the perforation station the card is advanced by card feed wheels G to the read station while a following card is advanced to the perforating station. The card passes step-by-step past the read station under control of card feed wheels H while the following card advances step-by-step past the perforating station. After leaving the reading station the card is advanced by card feed wheels J to a pre-stack position K and then by other means is moved at right angles to its former direction of movement to a stacker hopper at L.

Only so much of the circuitry of the machine as is necessary to the understanding of the present invention is described. Reference may be had to the Gardinor patent for additional details. The components of the circuit of the machine that are referred to are similarly designated therein and in the present application and are as follows: a zero potential line 403, a positive potential line 402, a minus 35 volt line 406, cam contacts PR2, CF3 and CF4, a card lever contact 62, a relay R3, an escape magnet 104, an escape ratchet 102, an armature 103, a friction clutch 91, a drive motor 14, a keyboard restore magnet 352, a program drum 230 and vacuum tubes T–1 and T–4. The control circuits for the present invention are interrelated with the above designated components and are shown in Fig. 4 in the partial wiring diagram. The card feed mechanism and the program drum 230 and its connection with the card feed mechanism are shown schematically in Fig. 1.

The escapement means for feeding cards through the perforating and reading stations are controlled by the hereinbefore referred to escape magnet 104. The magnet 104 operates the armature 103 that engages the ratchet wheel 102. When the magnet is energized, the armature is withdrawn from the ratchet wheel and the records are advanced by the motor 14, the friction clutch 91 and the gear train shown in Fig. 1, until the magnet 104 is de-energized. The armature then moves under tension of the spring back into engagement with the ratchet wheel.

The step-by-step movement referred to hereinbefore is achieved by momentarily energizing the magnet 104 so that only a single tooth advance of the ratchet wheel is permitted before the magnet is deenergized and the armature reengages the ratchet wheel. More extensive record movements are achieved by holding the magnet 104 energized for longer periods of time.

The hereinbefore referred to cam contact PR2 is operated by a cam surface on the program drum 230 that is associated with the hereinbefore mentioned escapement means and makes one revolution while a record card passes through the perforating station or reading station. After the last column of a card is perforated, the contact PR2 transfers. The transferred contact PR2 initiates the escapement of the card in the manner described in the Gardinor patent and the previously mentioned cam CF4 commences rotating and completes a circuit through the contact CF4, through the card lever contact 62 closed by the presence of a card at the punch station, and through the R3 relay coil thereby picking up the relay R3. The relay R3 is held through other circuits that are described in the Gardinor patent.

Each time a key on the machine keyboard is depressed, that key is latched down, and is so interlocked with the other keys that it is impossible to actuate another key until the latched key has been restored to its unlatched position. The keyboard restore magnet 352, referred to hereinbefore and shown in Fig. 5, when energized, is effective to restore the latched keys. The magnet 352 is energized through the vacuum tube T–1 that is caused to conduct in a manner that is fully described in the Gardinor patent.

Concurrently with the rotation of the cam CF4, a cam CF3 also is rotated and closing the contact CF3 at 350° of the cam cycle and opening at 190° of the following cam cycle and, therefore, during the card punching operation that occurs between cam cycles, the contact CF3 is closed. After a card is perforated in its last index column and has escaped one step therefrom, a card feed cycle is initiated in the usual manner. It is at 190° of that cycle that the contact CF3 opens and it remains open until 350° of the same cycle. The normal function of the contact CF3 is to provide a hold circuit for a card feed latch magnet (not shown). The function of the above named components in connection with the present invention is described hereinafter in the circuit description.

The record feeding mechanism of the machine is quite reliable but, due to the nature of the records that are prepared, it is desirable to have means for further assuring that the records are properly positioned. By checking the position of a record once while it is at the perforating station and a second time while it is at the reading station, it may be assumed, with little likelihood of error, that the record has been properly positioned during its controlled movement through the corresponding stations. The points selected for such checking are the points at which the records normally are located after the record in the perforating station has escaped one step after perforation of its last index position and are designated RC and PC for Read Check and Punch Check respectively. The trailing edges of the records have been selected for checking but the leading edges could be used if the check units were so positioned.

A photocell checking unit is shown in Fig. 3, and is generally designated 10. The photocells and the means for mounting are shown in Fig. 4. A pair of photo resistive cells 11L (11-Leading) and 11T (11-Trailing) are mounted on insulating sheets 12 fixed, for example by cementing, to a support plate 13 also of insulating material, for example phenolic. Three leads designated 14T (Trailing), 14L (Leading) and 14I (Intermediate) comprising wires recessed in the phenolic plate 13 and terminals extending from the lower side of the phenolic plate 13 as shown in Figs. 2 and 3 are connected to the photocell unit. The lead wire 14L is connected to one side of the cell 11L; the lead wire 14T is connected to one side of the cell 11T; and the lead wire 14I is connected to a point 16 that is connected to both of the cells 11L and 11T. A series circuit is complete through the lead wire 14L, the cell 11L, the point 16, the cell 11T and the lead wire 14T. The lead wire 14I comprises a tap between the cells 11L and 11T for a purpose described hereinafter.

Each photocell unit 10 is mounted in the usual record support bed M of the machine, as shown in Figs. 2 and 3, so that it is flush with the bed surface. Referring to Fig. 3, a light source 19 is positioned above each sensing unit 10. The resistance of the photo resistive cells 11T and 11L varies inversely with the light intensity falling thereon. Each pair of series connected photocells is so positioned that, as a card C advances toward the sensing unit, it first covers the trailing photocell 11T and then the leading photocell 11L. As the card advances further the trailing photocell 11T is uncovered first and then the photocell 11L is uncovered. With a predetermined difference of potential imposed across the serially connected cells, the voltage drop across the cells divides in proportion to the resistance of each cell thereby effecting a predetermined potential at the point 16 midway between the photocells. When a card C covers the trailing photocell 11T, the latter is cut off from the light source 19 and its resistance increases. A larger portion of the imposed potential is expended in the unlighted cell 11T and the potential of the intermediate point 16 changes in a direction depending on the polarity of the imposed potential.

When the card C advances further, it also covers the leading photocell 11L thereby cutting the latter off from the light source 19. With both cells unlighted, the resistance of each cell increases proportionally and the potential again divides in the same proportion as when both cells were lighted. The intermediate point 16 is at the same potential as when both cells were lighted.

When the card C advances still further, the trailing photocell 11T is uncovered and exposed to the light source 19; the resistance of the latter cell decreases and the voltage drop thereacross decreases; the potential of the intermediate point 16 changes in a direction opposite to the previously described change. When the card C advances still further, the leading photocell 11L also is uncovered thereby restoring both photocells and the potential of the intermediate point 16 to the original status.

Each photo sensing unit 10 is so positioned that, when a card reaches a check point, RC or PC, the trailing edge of the record should be poitioned so that it covers the leading photocell 11L and leaves the trailing photocell 11T exposed to the light source 19. Referring to Figs. 2 and 5, the various components of sensing units at the check point RC and PC have reference numbers corresponding to the numbers in Figs. 3 and 4; however those referring to the read station unit have a prefix R, whereas those referring to the punch station have a prefix P. The intermediate points R16 and P16 are connected by the leads R141 and P141 to the grids 17 of a type 2D21 thyratron 18. When a card C1 is positioned at the check point RC, the potential of the intermediate point R16 and the associated grid 17 is such that the thyratron 18 conducts if the other grid 17 also is similarly conditioned due to similar positioning of a second card C2 at the check point PC. The thyratron 18 is connected in a circuit that is described in detail hereinafter.

The photocells P11T, P11L, R11T and R11L, the associated thyratron 18, and the associated electrical components shown in Fig. 5 are generally designated 20. A second unit, also shown in Fig. 5 is a visual indicating device, generally designated 21, for indicating when a record is out of registration. The unit 21 also indicates which record is out of registration.

The pairs of serially connected photocells R11T and

R11L, and P11T and P11L, are connected in parallel. The lines R14L and P14L are connected to a minus 35 volt line 406 and, at test time, the lines R14T and P14T are connected through a potentiometer 22 and the contacts 31-2 to the positive potential line 402. The potentiometer is adjusted so that the lines R14T and P14T at plus 23 volts. The normal resistance of the cells R11T, P11T, R11L and P11L are equal so that the 58 volt potential difference divides equally and the intermediate points R16 and P16 are at —6 volts which is below the cut off voltage of the associated grids 17. The thyratron grids 17 are normally biased to below cut off potential through 2.7 megohm resistors to a minus 24 volt tap of a voltage divider network that is tied between the zero volt line 403 and the minus 35 volt line 406. Each grid 17 is capacitively coupled to the cathode of the thyratron 18.

When a leading cell R11L or P11L is cut off from the respective light source R19 or P19 while the associated trailing cell R11T or P11T is still exposed to the light source, the resistance of the trailing cell R11T or P11T is reduced below the associated resistance of the leading cell R11L or P11L to such an extent that the drop across the trailing cell is 23.5 volts instead of 29 volts. The intermediate point R16 or P16 is then at —0.5 volt which is above the cut off voltage of the associated grid 17. If both of the intermediate points R16 and P16 are raised to the —0.5 volt level at the same time, the thyratron fires, completing a circuit from its cathode to its plate.

The intermediate points R16 and P16 are also connected by leads R23 and P23 to the control grids R24 and P24 respectively of a type 12AU7 dual triode 25. The two plates of the triode 25 are connected through 47K ohm plate resistors and the contacts 31-2 to the plus line 402. Neon indicating tubes R26 and P26 are connected from points R27 and P27 between each plate and the corresponding plate resistor to the zero potential line 403.

At test time the grids R24 and P24 of the triode 25 are at the same potential as the respective intermediate points R16 and P16 to which they are connected. When a triode grid R24 or P24 is at —6 volts, as when indicating non-registration of a record, the associated side of the triode 25 remains non-conducting and a 67 volt potential difference exists across the corresponding neon tube R26 or P26 whose firing voltage is approximately 50 volts. The neon tube fires and the glow indicates that the corresponding record is out of registration with the associated photocell sensing unit 10. When a record is properly registered with the associated photocell sensing unit 10, the corresponding intermediate point R16 or P16 is at —0.5 volt and the corresponding half of the triode 25 conducts. The point R27 or P27 between the plate and the plate resistor is reduced from 67 volts to 40 volts. Since the firing voltage of a neon tube R26 or P26 is approximately 50 volts, the existing 40 volts is not sufficient to cause the tube to fire and the non-glowing state of the neon tube visually indicates that the associated record is in registration with the associated photocell sensing unit 10. For an instant before the triode 25 conducts, the 67 volt potential is applied across the neon tube R26 or P26 and a momentary glow results even if the cards being checked are properly registered. To prevent the instantaneous glow, a capacitor R28 or P28 is connected around the associated neon tube R26 or P26 to absorb the initial surge of current.

Assume that one card $C_1$ is positioned at the read station and a second card $C_2$ at the perforating station and that the last index position of the latter card has just been perforated. A single step of escapement is automatically initiated and the contact PR2 transfers (it will be noted that a normally closed point has been added to PR2). From a source (not shown) the first grid of the tube T-4, when fired, energizes the escape magnet 104 in the manner described in the Gardinor patent; however, through the transferred contact PR2 and a normally closed point 30-1 of a relay R30, a zero potential is applied to the screen grid of the tube T-4 thereby preventing the latter from conducting. Simultaneously, a relay R31 in a circuit including the now open point of the contact PR2 is deenergized and normally open contact points 31-1 and 31-2 close (considering R31 to be normally energized). The point 31-1, through a normally closed point 30-2 of the relay R30, applies the zero potential of the line 403 to the screen grid of the tube T-1 thereby preventing the latter from conducting and energizing the keyboard restore magnet 352 that normally restores the keyboard at this point of the machine operation. The point 31-2 connects the plates of the indicating unit 21 and the leads R14T and P14T with the positive potential line 402. If both of the cards $C_1$ and $C_2$ are properly positioned, the thyratron 18 fires as previously described and picks the relay R30 through a pick coil R30P in the plate circuit of the thyratron 18. The relay R30 opens its points 30-1 and 30-2. The opening of the point 30-1 removes the zero potential from the screen grid of the tube T-4 which then conducts and energizes the escape magnet 104 to effect escapement of the cards from the reading and perforating stations. The opening of the point 30-2 removes the zero potential from the screen grid of the tube T-1 which then conducts and energizes the keyboard restore magnet 352 which in turn restores the keyboard.

The relay R30 is held through the thyratron 18 until 190° of the card feed cycle at which time the contact CF3 opens the cathode circuit thereof extinguishing the thyratron 18. At 65° of the card feed cycle, before CF3 opens, the contact CF4 closes and picks up the relay R3 through the then closed card lever contact 62 and provides a hold circuit for the relay R30 through the relay point 3e.

If one or both of the cards $C_1$ and $C_2$ are out of registration, the thyratron 18 does not fire and the relay R30 is not picked up. One or both of the neon tubes R26 or P26 fire depending on whether one or both of the cards are out of registration. The operator is thus notified of the error so that appropriate action may be taken. To effect escapement of the cards the operator depresses a key 34 closing a contact 34-1 that completes a circuit from the line 403 through the contact 34-1 and the hold coil H of the relay R30 to the line 402. The relay R30 is thereby picked up and the escapement and keyboard restoration are effected as described hereinbefore.

Just before a perforated card reaches the reading station, whether escapement was automatically or manually initiated, and a new card reaches the perforating station, the contact PR2 transfers back to normal and picks up the relay R31. The relay point 31-1 opens to prevent the zero potential from being applied to the screen grid of the tube T-1 through the normally closed point 30-2. The point 31-2 opens removing the positive potential from the plates of the unit 21 thereby extinguishing the neon tubes R26 and P26 if they are lighted, and removing the positive potential from the leads R14T and P14T.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a cyclically operable record handling device, a record support; means for moving successive records in a predetermined path relative to said record support; means for disabling said moving means at predetermined times of said cyclical operation; means positioned adjacent each of two points of said path and operable by a said record adjacent each said point at said predetermined times and means operable by last said means for enabling said moving means.

2. In a cyclically operable record handling device, a record support; means for moving successive records in a predetermined path relative to said record support; means for disabling said moving means at predetermined times of said cyclical operations; means positioned at a plurality of points along said path and operable by a said record positioned in a predetermined relation adjacent each said point; and means operable by last said means for enabling said moving means.

3. In a cyclically operable record handling device, a record support; means for moving successive records in a predetermined path relative to said record support; means for disabling said moving means at predetermined times of said cyclical operation, two light sources positioned adjacent two points of said path; photo means positioned adjacent each said point on the side of said path opposite said light sources such that said records move between said light sources and said photo means, each said photo means being operable by coincident predetermined positioning of a said record therewith while said moving means are disabled; and means operable by coincident operation of both said photo means for enabling said moving means.

4. The invention set forth in claim 3 having means for visually indicating when at least one of said photo means is not operated at said predetermined times.

5. The invention set forth in claim 3 wherein last said operable means and said photo means comprise an electron tube having an anode, a cathode, a first grid and a second grid; means for applying a difference of potential between said anode and said cathode; two pairs of serially connected photo resistances having said difference of potential applied thereacross whereby a predetermined potential exists at points midway between said photo resistances of each said pair and whereby the interposition of a said record between each said light source and associated said resistances blocking light only from single corresponding cells of each said pair of resistances is effective to raise the potential of said midpoints, the blocking of light from both said cells of both said pairs is effective to return the potential of said midpoints to said predetermined value, and the blocking of light from only the other corresponding cells of said pairs is effective to lower the potential of said midpoints; means for connecting said first grid to one said midpoint and said second grid to the other said midpoint whereby said electron tube is caused to conduct when the potential of both said midpoints is raised.

6. The invention set forth in claim 5 including a pair of triodes; having said difference of potential applied between the anodes and cathodes thereof; means for connecting the grid of one said triode with one said midpoint and the grid of the other said triode with the other said midpoint whereby said triodes are caused to conduct when the potentials of respectively associated said midpoints are raised; normally extinguished light sources connected between ground and the plate of each said triode whereby a last said light source remains extinguished when the associated said triode conducts at said predetermined times and said light source glows when the associated said triode fails to conduct at said times.

7. In a cyclically operable record handling machine having a record support; means for moving successive records in a predetermined path relative to said record support; means for disabling said moving means at predetermined times during said cyclical operation; a plurality of photo means positioned along said path for detecting, simultaneously, predetermined positioning of a record relative to each said photo means while said moving means are disabled; and means for enabling said moving means when records are detected simultaneously in each said predetermined position.

8. In a cyclically operable record handling machine having a record support; means for moving successive records in a predetermined path relative to said record support; means for disabling said moving means at predetermined times during said cyclical operation; photo sensitive means positioned at two points along said path for determining whether pairs of successive records stop in predetermined positions with respect to said points when said moving means are disabled; and means operable by said photo sensitive means for enabling said moving means.

No references cited.